INVENTOR.
FRIEDRICH K. H. NALLINGER.
BY Dicke and Padlow
ATTORNEYS.

Jan. 25, 1955   F. K. H. NALLINGER   2,700,428
MOTOR VEHICLE WITH CAB OVER ENGINE
Filed Sept. 30, 1949   2 Sheets-Sheet 2
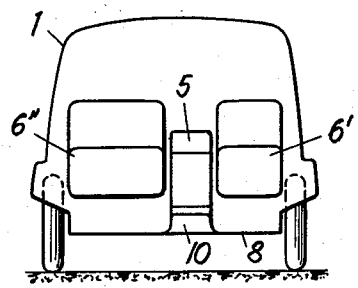
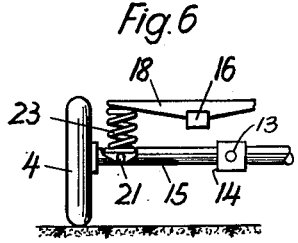
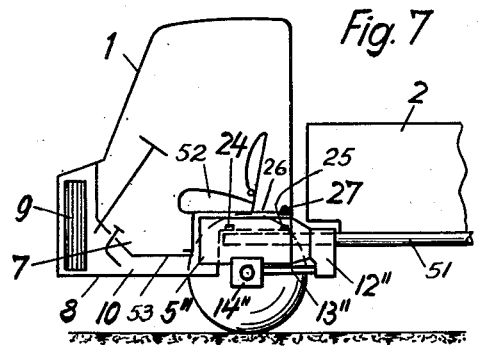
INVENTOR.
FRIEDRICH K.H. NALLINGER.
BY Dicke and Padlon
ATTORNEYS.

United States Patent Office 2,700,428
Patented Jan. 25, 1955

2,700,428

MOTOR VEHICLE WITH CAB OVER ENGINE

Friedrich K. H. Nallinger, Stuttgart, Germany

Application September 30, 1949, Serial No. 118,736

Claims priority, application Germany October 1, 1948

4 Claims. (Cl. 180—89)

The present invention relates to certain improvements in the design and construction of motor vehicles, more particularly, small commercial vehicles, e. g., trucks or delivery cars having the motor at the front end.

It is an important object of the present invention to provide a motor vehicle of this kind which has a favorable empty weight and a favorable spatial arrangement.

Another object of the present invention is to provide a vehicle with a driver's cab which permits an unimpeded vision of the road and a large freedom of motion combined with favorable entrance and alighting conditions.

A special object of the present invention is to provide a foot space which is not substantially or not at all interfered with by the engine and the frame or chassis.

Still another object of the present invention is to provide a motor whose overall height is so low that it can be accommodated under the seats of the driver's cab.

Still another object of the present invention is to provide a particularly simple, light, and cheap design, more particularly in regard to a light chassis which is stiff against torsion and characterized by a simple and efficient springing or cushioning of the axles.

Still another object of the present invention is to provide a design in which the driver's cabin as well as the motor and the motor gear block are arranged very close to the front end of the vehicle, preferably with a low center of gravity, so that the front axle is well loaded. In this case the useful space can be extended in a forward direction up to the front wheels, and in case of a fully loaded vehicle the front and rear axles can be uniformly loaded. The wheel base can be very short and my novel vehicle thus can be made particularly light and maneuverable.

Other and further objects, features and advantages of the invention will be pointed out hereinafter and appear in the appended claims forming part of the application.

In the accompanying drawing, several preferred embodiments of the present invention are shown by way of illustration and not by way of limitation.

In the drawing:

Fig. 5 is a sectional front view taken on line V—V of Fig. 1;

Fig. 6 is a sectional view of a section taken on line VI—VI of Fig. 2; and,

Fig. 7 is a partial sectional view of another embodiment of the invention.

Similar reference numerals denote similar parts in the different figures.

Figure 1:
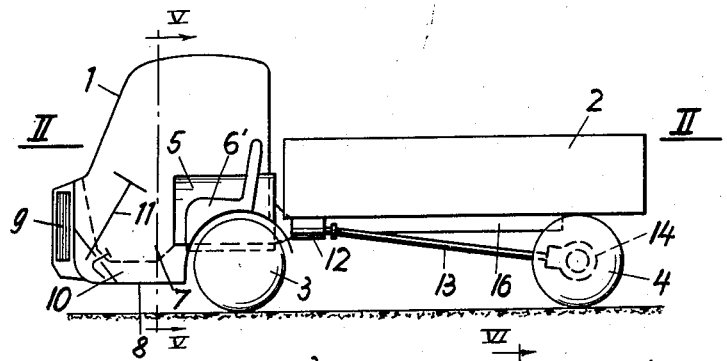
Fig. 1 is a side elevation of a first embodiment of the invention, with the left hand side wall of the driver's cab detached.

Referring now to the drawing in greater detail, it will be seen that 1 is the driver's cab, 2 is the loading trough, 3 are the front wheels and 4 the rear wheels of the vehicle.

Figure 2:
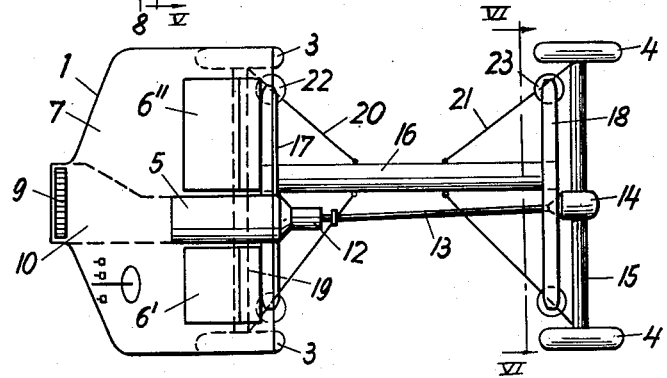
Fig. 2 is a horizontal section on line II—II of Fig. 1, without the loading trough.

In the embodiment as per Figs. 1, 2 and 5 the motor 5 is arranged between the front wheels or between the driver's seat 6' and the attendant's seat 6" in such a manner that it protrudes only slightly beyond the seats in a forward direction. Thus, a free space 7 is provided extending over the whole width of the vehicle including a low level floor 8 in front of the seats and in front of the motor. A relatively small channel or tunnel 10 may be arranged in the floor for the front radiator 9, whereby, however, the free motion of the driver or of his attendant is not substantially impeded. The steering gear leading from the steering column 11 to the front axle as well as the remaining operating and transmission gear shifting means (not shown) required may be accommodated underneath the floor or also in small channels in a well-known manner.

The driving force is transmitted from the motor through the change speed gear 12, the driving shaft 13, the rear axle gear 14 and the rear axle 15 to the rear wheels 4. The chassis comprises a central, tubular longitudinal bearer 16 which, as shown in Fig. 2, is somewhat displaced laterally from the central longitudinal plane of the vehicle opposite to the motor gear block and the axle gear, and which is fixedly connected or welded to a front cross bearer 17 and a rear cross bearer 18. The front axle 19 and the rear axle 15 may be guided with respect to the frame by means, in the form of rigid axles, and diagonal torque beams 20 and 21, which are linked to the frame by lateral joints and cushioned by helical springs 22 and 23, whose lower ends bear against the torque beams while their upper ends bear against the cross bearers 17 and 18. The loading trough 2 projects only by a small amount over the rear axle.

Figure 3:
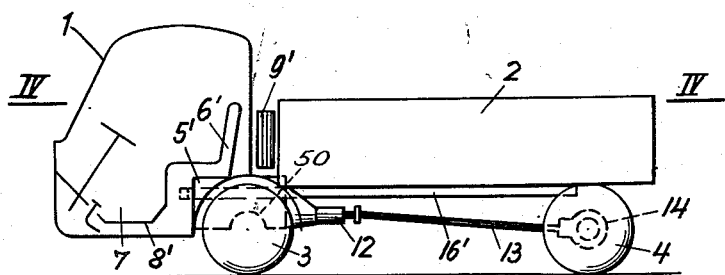
Fig. 3 is a side elevation similar to Fig. 1, but showing a second embodiment.
Figure 4:
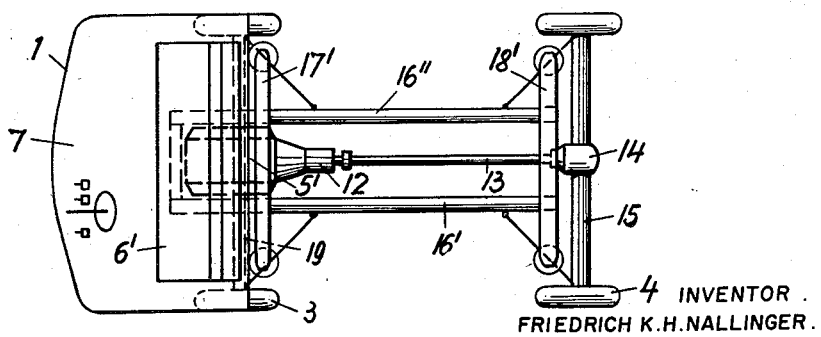
Fig. 4 is a section on line IV—IV of Fig. 3, also without the loading trough.

In the embodiment shown in Figs. 3 and 4, the engine 5', comprising horizontal or V-shaped cylinders, is suspended between a frame consisting appropriately of two tubular longitudinal bearers 16', 16" which are advantageously spaced from each other by an amount just sufficient to mount the motor therebetween. The cross bearers 17' and 18' which may also be tubular and welded to the longitudinal bearers serve, as in the first embodiment, for supporting helical springs or the like. In a vertical direction the engine 5', e. g. of the type with horizontal cylinders, is moreover disposed in the space between the front axle for which an approximate channel-shaped recess 50 may be provided in the motor casing, if desired, and the through-going seats 6' which are arranged forward of the front axle. The radiator 9' behind the driver's cab may receive the cooling air from the side or from below, e. g., through the double-walled floor 8' and through the space under the seats 6' on the side of the motor.

In the illustrated embodiment according to Fig. 7, the cab 1 is mounted on the front end of the longitudinal beams 51 and bolted thereonto at 24 and 25. Motor 5" is arranged underneath a hood 26 which is linked at 27 to the cab or chassis and which hood 26 supports a foldable seat 52. The motor drives a shaft 13" and an axle gear 14" of the front wheels by means of a transmission 12". The front wheels may, for example, be steered independently of each other by links. Floor 8 is again arranged as low as possible, approximately at the height of the wheel center, and is merely intersected by a tunnel 10 whose upper edge 53 is arranged only slightly above the remaining floor so that it offers substantially no obstruction. The longitudinal beams 51 terminate underneath seat 52, and thereby also do not obstruct the foot space in front of the seats so that a foot space 7 which extends substantially freely over the entire width of the vehicle is assured.

In each case the motor is advantageously covered. By removal of the covering bonnet, if necessary after lifting the seats, the motor can easily be inspected and attended. Advantageously the arrangement is made so that on release of the operating members, etc., to be operated by the driver and on undoing of the necessary fixing screws the driver's cab can be removed from the vehicle as a unit. The invention can also be applied to vehicles with front wheel drive, as illustrated in Fig. 7.

While the invention has been described in detail with respect to certain now preferred examples and embodiments of the invention, it will be understood by those skilled in the art after understanding the invention, that various changes and modifications may be made without departing from the spirit and scope of the invention, and it is intended therefore, to cover all such changes and modifications in the appended claims.

Having thus described my invention, I claim as new and desire to secure by Letters Patent:

1. In a motor vehicle, a pair of front wheels, a chassis including a longitudinal beam disposed to one side of the vertical longitudinal middle plane of the vehicle, an internal combustion engine located on the other side of said plane between said front wheels and mounted on said chassis, a driver's cab above and mainly in front of said wheels and housing the engine, said cab being mounted on and extending forwardly of the chassis, a seat in said cab on each side of the engine, said beam extending from a transverse plane near the rear axle up to said seats, and said cab having a floor extending unimpeded over the whole width of said vehicle and being located in a plane lower than the beam.

2. In a motor vehicle, a pair of front wheels, a pair of rear wheels, a chassis including a longitudinal beam disposed at one side of the vertical longitudinal middle plane of said vehicle, a front engine disposed at the forward end of the chassis, a driving shaft extending from said engine to said rear wheels, said driving shaft being disposed at the other side of said longitudinal plane, a driver's cab mounted on said chassis and located mainly in front of said front wheels and housing said engine, seats in said cab, said longitudinal beam extending from a transverse plane near the rear axles up to said seats, and a floor for the cab extending unimpeded over the whole width of said vehicle at the forward part thereof.

3. In a motor vehicle, a pair of front wheels, a pair of rear wheels, an axle for each of said pair of wheels, a chassis including a longitudinal beam disposed at one side of the vertical longitudinal middle plane of the vehicle, a driver's cab mounted on said chassis and located mainly in front of said front wheels, seats in said cab, a front engine housed in the cab, a driving shaft extending from said engine to said rear wheels, said driving shaft being disposed at the other side of said longitudinal plane, said beam extending from a transverse plane near the rear axle up to said seats, and a floor for the cab extending unimpeded over the whole width of the front of said vehicle and being located in a plane lower than said beam.

4. In a motor vehicle, a pair of front wheels, a pair of rear wheels, a chassis including a longitudinal beam disposed at one side of the vertical longitudinal middle plane of said vehicle, a driver's cab mounted on said chassis and located mainly in front of said front wheels, and seats in said cab, an internal combustion engine at the other side of said longitudinal middle plane and housed in the cab, a driving shaft extending from said engine to said rear wheels, said driving shaft being disposed also at said other side of said longitudinal plane, said longitudinal beam extending from a transverse plane near the rear axle up to said seats.

References Cited in the file of this patent

UNITED STATES PATENTS

| Number | Name | Date |
|---|---|---|
| 1,852,464 | Leipert | Apr. 5, 1932 |
| 1,856,773 | Masury | May 3, 1932 |
| 2,035,212 | Alborn | Mar. 24, 1936 |
| 2,064,100 | Bachman | Dec. 15, 1936 |
| 2,154,011 | Reinoehl et al. | Apr. 11, 1939 |
| 2,187,410 | Avila | Jan. 16, 1940 |
| 2,234,025 | Dellert | Mar. 4, 1941 |
| 2,240,236 | Aitken | Apr. 29, 1941 |
| 2,251,698 | Willson | Aug. 5, 1941 |
| 2,362,453 | Casper | Nov. 14, 1944 |
| 2,367,817 | Brown | Jan. 23, 1945 |
| 2,396,506 | Harris | Mar. 12, 1946 |
| 2,404,794 | Fajeol | July 30, 1946 |
| 2,502,622 | Harris | Apr. 4, 1950 |

FOREIGN PATENTS

| Number | Country | Date |
|---|---|---|
| 486,901 | Germany | Nov. 27, 1929 |
| 517,281 | Great Britain | Jan. 25, 1940 |
| 571,605 | France | Feb. 6, 1924 |
| 806,565 | France | Sept. 28, 1936 |
| 906,367 | France | May 14, 1945 |